United States Patent
Sorkin

(10) Patent No.: US 6,550,816 B1
(45) Date of Patent: Apr. 22, 2003

(54) GROUT VENT FOR A TENDON-RECEIVING DUCT

(76) Inventor: Felix L. Sorkin, 13022 Trinity Dr., Stafford, TX (US) 77477

( * ) Notice: Subject to any disclaimer, the term of this patent is extended or adjusted under 35 U.S.C. 154(b) by 0 days.

(21) Appl. No.: 10/055,079

(22) Filed: Jan. 25, 2002

(51) Int. Cl.[7] .................................................. F16L 5/02
(52) U.S. Cl. .................. 285/139.1; 285/903; 285/139.2
(58) Field of Search ............... 285/903, 139.1, 285/139.2, FOR 143, 133.11, 209

(56) References Cited

U.S. PATENT DOCUMENTS

| | | | | |
|---|---|---|---|---|
| 3,181,899 A | * | 5/1965 | McKnight | 285/139.2 |
| 5,474,335 A | | 12/1995 | Sorkin | |
| 5,478,123 A | * | 12/1995 | Kanao | 285/291.1 |
| 5,560,163 A | * | 10/1996 | Carlton | 285/219 |
| 5,689,921 A | * | 11/1997 | Carlton | 285/901 |
| 5,762,300 A | | 6/1998 | Sorkin | |
| 5,775,849 A | * | 7/1998 | Sorkin | 285/322 |
| D400,670 S | | 11/1998 | Sorkin | |
| 5,833,394 A | * | 11/1998 | McCavour | 405/126 |
| 5,954,373 A | | 9/1999 | Sorkin | |
| 6,209,929 B1 | * | 4/2001 | Ikegami et al. | 285/139.2 |
| 6,237,969 B1 | * | 5/2001 | Amatsutsu | 285/357 |
| 6,435,567 B2 | * | 8/2002 | Kikumori et al. | 285/319 |

\* cited by examiner

*Primary Examiner*—Eric K. Nicholson
(74) *Attorney, Agent, or Firm*—Harrison & Egbert

(57) ABSTRACT

A grout vent for a tendon-receiving duct having a tubular fitting with an interior passageway, a nut secured around an exterior surface of the tubular fitting, and a seal extending around the tubular fitting and residing against a surface of the nut. The tubular fitting has a connector at an end thereof for engaging an interior surface of the duct. The tubular fitting extends through a hole formed in a corrugation of the duct so that a shoulder of the connector will abut an interior surface of a wall of the duct. The nut is threadedly engaged with an exterior surface of the tubular fitting so as to exert a compressive force against the seal. A grout line extends through the interior passageway of the tubular fitting so as to allow grout to be injected into an interior passageway of the duct.

11 Claims, 4 Drawing Sheets

GROUT VENT FOR A TENDON-RECEIVING DUCT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to duct assemblies for use in post-tension construction. More particularly, the present invention relates to grout vents that are used to inject grout for sealing the interior of fully encapsulated post-tension construction systems.

BACKGROUND OF THE INVENTION

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts; or the like, are used to capture the cable at the anchor plate and, as the jack is removed from the tendon, to prevent its relaxation and hold it in its stressed condition.

Multi-strand tensioning is used when forming especially long post-tensioned concrete structures, or those which must carry especially heavy loads, such as elongated concrete beams for buildings, bridges, highway overpasses, etc. Multiple axially aligned strands of cable are used in order to achieve the required compressive forces for offsetting the anticipated loads. Special multi-strand anchors are utilized, with ports for the desired number of tensioning cables. Individual cables are then strung between the anchors, tensioned and locked as described above for the conventional monofilament post-tensioning system.

As with monofilament installations, it is highly desirable to protect the tensioned steel cables from corrosive elements, such as de-icing chemicals, sea water, brackish water, and even rain water which could enter through cracks or pores in the concrete and eventually cause corrosion and loss of tension of the cables. In multi-strand applications, the cables typically are protected against exposure to corrosive elements by surrounding them with a metal duct or, more recently, with a flexible duct made of an impermeable material, such as plastic. The protective duct extends between the anchors and in surrounding relationship to the bundle of tensioning cables. Flexible duct, which typically is provided in 20 to 40 foot sections, is sealed at each end to an anchor and between adjacent sections of duct to provide a water-tight channel. Grout then may be pumped into the interior of the duct in surrounding relationship to the cables to provide further protection.

Various patents have issued, in the past, for devices relating to such multi-strand duct assemblies. For example, U.S. Pat. No. Des. 400,670, issued on Nov. 3, 1998, to the present inventor, shows a design of a duct. This duct design includes a tubular body with a plurality of corrugations extending outwardly therefrom. This tubular duct is presently manufactured and sold by General Technologies, Inc. of Stafford, Tex., the licensee of the present inventor.

This duct design has a tubular body with a plurality of corrugations which extend radially outwardly from the outer wall of the tubular body. The tubular body includes an interior passageway suitable for receiving multiple post-tension cables and strands therein. The interior passageway of the tubular body is suitable for receiving a grout material so as to maintain the multiple strands in a liquid-tight environment. The tubular body, along with the corrugations, are formed of a polymeric material. The duct can be of any length, as desired. Couplers can be used so as to secure lengths of the duct together in an end-to-end relationship.

The present inventor is also the inventor of U.S. Pat. No. 5,474,335, issued on Dec. 12, 1995. This patent describes a duct coupler for joining and sealing between adjacent sections of duct. The coupler includes a body and a flexible cantilevered section on the end of the body. This flexible cantilevered section is adapted to pass over annular protrusions on the duct. Locking rings are used to lock the flexible cantilevered sections into position so as to lock the coupler onto the duct. U.S. Pat. No. 5,762,300, issued on Jun. 9,1998, to the present inventor, describes a tendon-receiving duct support apparatus. This duct support apparatus is used for supporting a tendon-receiving duct. This support apparatus includes a cradle for receiving an exterior surface of a duct therein and a clamp connected to the cradle and extending therebelow for attachment to an underlying object. The cradle is a generally U-shaped member having a length greater than a width of the underlying object received by the clamp. The cradle and the clamp are integrally formed together of a polymeric material. The underlying object to which the clamp is connected is a chair or a rebar.

U.S. Pat. No. 5,954,373, issued on Sep. 21, 1999, to the present inventor, shows another duct coupler apparatus for use with ducts on a multi-strand post-tensioning system. The coupler includes a tubular body with an interior passageway between a first open end and a second open end. A shoulder is formed within the tubular body between the open ends. A seal is connected to the shoulder so as to form a liquid-tight seal with a duct received within one of the open ends. A compression device is hingedly connected to the tubular body for urging the duct into compressive contact with the seal. The compression device has a portion extending exterior of the tubular body.

One of the problems with these prior art systems is the ability to inject grout into the interior passageway of the duct assembly. Under certain circumstances, the grout can be injected in the areas of the couplers between adjacent lengths of duct assemblies. In other cases, the grout is injected prior to joining the ducts in end-to-end relationship. Under other circumstances, a hole is drilled into the material of the duct so as to allow a grout line to be placed into the interior of the duct assembly. Unfortunately, this process can create various obstacles to the extension of the tendons through the interior passageway of the duct assembly. Additionally, it does not establish a very secure relationship between the grout line and the wall of the duct. Often, there is a great deal of leakage. In other circumstances, the formation of any voids or holes in the wall of the tubular duct, or in the areas of the couplers, can actually allow water penetration into the interior of the duct. As a result, a need has developed so as to form a proper grout vent for such tendon-receiving ducts.

It is an object of the present invention :to provide a grout vent for a tendon-receiving duct which allows for grout to be injected into the interior passageway of the duct.

It is another object of the present invention to provide a grout vent which establishes a liquid tight seal with the duct.

It is another object of the present invention to provide a grout vent which can be easily installed through a hole formed on the body of the duct.

It is still another object of the present invention to provide a grout vent which avoids any interference with the installation of tendons through the interior passageway of the duct.

It still a further object of the present invention to provide a grout vent for a tendon-receiving duct which is easy to use, relatively inexpensive and easy to manufacture.

These and other objects and advantages of the present invention will become apparent from a reading of the attached specification and appended claims.

BRIEF SUMMARY OF THE INVENTION

The present invention is a grout vent for a tendon-receiving duct comprising a tubular fitting having an interior passageway, a nut secured around an exterior surface of the tubular fitting, and a sealing means extending around the tubular fitting for forming a generally liquid-tight seal with an exterior surface of the duct. The tubular fitting has a connection means at an end thereof for engaging an interior surface of the duct.

In the present invention, the nut exerts a compressive force against the sealing means at an end of the sealing means opposite the duct. The nut is threadedly engaged with the exterior surface of the tubular fitting. The sealing means comprises an annular washer compressively interposed between the nut and the exterior surface of duct. The connection means is an outwardly extending shoulder formed at the end of the tubular fitting. The shoulder has a surface for abutting the interior surface of the wall of the duct. The interior passageway of the tubular fitting is threaded. As a result, the grout line can have an end threadedly engaged with this interior passageway. The grout line will extend outwardly of the tubular fitting. The grout line has an end opening at the end of the tubular fitting so as to communicate with the interior of the duct.

The present invention is also a tendon-receiving duct having a grout vent. In the present invention, the duct is a tubular body having an interior passageway. A hole is formed through the wall of the tubular body. In particular, the tubular body has a plurality of corrugations extending radially outwardly therefrom. Each of the plurality of corrugations is in spaced relationship to an adjacent corrugation. Each of the plurality of corrugations opens to the interior passageway. In the present invention, the hole is formed on at least one of the plurality of the corrugations. In an alternative form of the present invention, the tubular body has a longitudinal channel extending between adjacent corrugations of the plurality of corrugations. In this alternative embodiment, the hole is formed on the longitudinal channel. The seal has a slot formed on an end thereof. This slot has a shape conforming to the exterior surface of the corrugation.

DETAILED DESCRIPTION OF THE INVENTION

Figure 1:
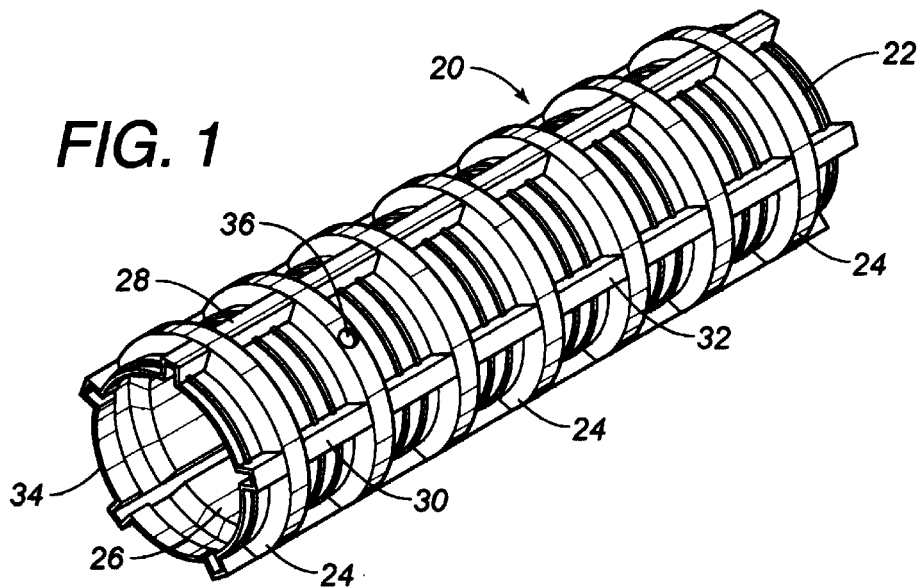
FIG. 1 is a perspective view of a tendon-receiving duct as used with the present invention.

Referring to FIG. 1, there is shown the tendon-receiving duct 20 as used in association with the grout vent of the present invention. The tendon-receiving duct 20 includes a tubular body 22 having a plurality of corrugations 24 extending radially outwardly of the tubular body 22. Each of the corrugations 24 is in spaced relationship to an adjacent corrugation 24. The tubular body 22 has an interior passageway 26 suitable for receiving tendons (or post-tension cables) therein. Each of the plurality of corrugations 24 opens within the tubular body 22 to the interior passageway 26. Longitudinal channels 28, 30 and 32 are formed on the tubular body 22 and communicate between the corrugations 24.

The tubular body 22 has a wall 34. The wall 34 defines the interior passageway 26. The longitudinal channel extends along the corrugations 24 in generally parallel relationship to the longitudinal axis of the tubular body 22. Similarly, the longitudinal channel 30 will extend between the corrugations 24. Longitudinal channel 32 also extends between the corrugations 24. Each of the longitudinal channels 28, 30 and 32 has an interior which opens to the interior passageway 26.

In normal use, when grout is introduced into the interior passageway 26, it will begin to fill the voids within the interior passageway 26. The grout will initially fill the interior of the corrugations and push air bubbles outwardly therefrom. These air bubbles can migrate along the longitudinal channels 28, 30 and 32 toward the other corrugations. Eventually, the grout will fill the channels 28, 30 and 32 and slowly migrate along the remaining corrugations. As such, air bubbles within the corrugation are pushed further outwardly along the length of the respective longitudinal channels 28, 30 and 32.

The longitudinal channels 28, 30 and 32 also provide rigidity and stiffness in the longitudinal direction of the tubular body 22. As such, the tubular body 22 is less likely to curl up, whip or wobble during the installation of the tendons by a cablepusher. Because of the added stiffness provided by the longitudinal channels associated with the tubular body 22, installation of cables can occur in a quicker and more convenient manner. There is less of a likelihood of duct breakage when the tendons are installed in a quick and easy manner without wobble or whip by the duct 20.

Importantly, in accordance with the teachings of the present invention, a hole 36 is formed on one of the corrugations 24 associated with the tubular body 22. Hole 36 will communicate with the interior of the particular corrugation. Hole 36 provides a location into which the grout vent of the present invention can be installed. Importantly, within the concept of the present invention, it is possible for the hole 36 to be installed along one of the longitudinal channels extending between the various corrugations 24.

Figure 2:
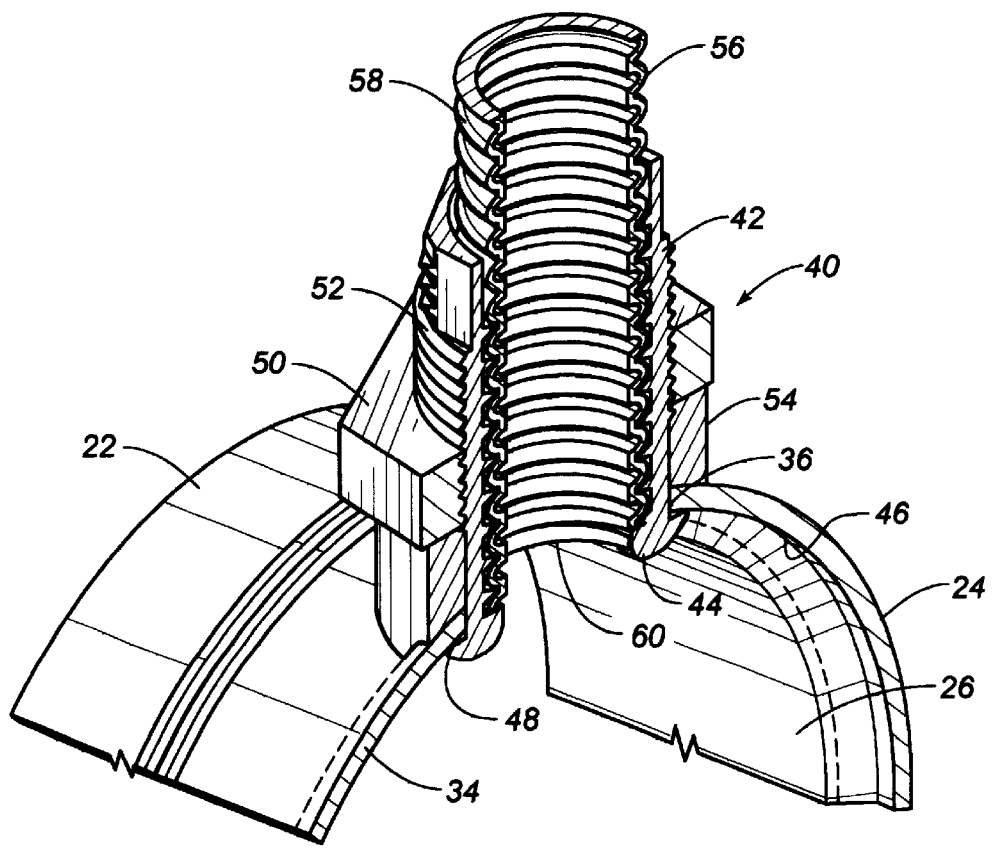
FIG. 2 is an upper perspective cross-sectional view showing the installation of the grout vent of the present invention within the tubular duct.

The installation of the grout vent 40 of the present invention is shown, with greater particularity, in FIG. 2. In FIG. 2, it can be seen that the tubular body 22 has a corrugation 24 opening to the interior passageway 26 of the tubular body 22.

Importantly, the grout vent 40 of the present invention includes a tubular fitting 42 which has a connector 44 at one end thereof. The connector 44 is suitable for engaging the interior surface 46 of the wall 34 of the tubular body 22. In the preferred embodiment of the present invention, the connector 44 includes an outwardly extending shoulder 48 which has a surface in abutment with the interior surface 46 of the wall 34. The tubular fitting 44 can be sufficiently flexible at its end so that the connector 46 can be compressively inserted through the hole 36 such that the shoulder 48 will properly engage the inner surface 46 of wall 34.

The tubular fitting 42 has a nut 50 secured around the exterior surface 52 of the tubular fitting 42. In particular, the exterior surface 52 is properly threaded. The nut 50 has an internally threaded section which will threadedly engage the threaded exterior surface 52 of the tubular fitting 42.

A seal 54 is interposed between an end of the nut 50 and the exterior surface of the tubular body 22. In particular, the seal 54 is an annular elastomeric washer which can be compressed against the exterior surface of the tubular body 22 by suitably tightening the nut 50 around the threaded exterior surface 52 of the tubular fitting 42. As a result, a liquid-tight seal is formed between the seal 54 and the exterior surface of the tubular body 22.

As can be seen in FIG. 2, a grout line 56 is received within the interior of the tubular fitting 42. In FIG. 2, it can be seen that the grout line 56 has a somewhat threaded or ridged exterior surface 58. As a result, the grout line 56 can have its end 60 threadedly received within the interior of the tubular fitting 42. The end 60 of the grout line 56 will communicate with the interior passageway 26 of the tubular body 22 of duct 20. The grout line 56 can extend outwardly of the tubular fitting 42 to a surface location. Grout can be injected through the interior of the grout line 56 so as to fill the interior passageway 26 of the tubular body 22.

Figure 3:
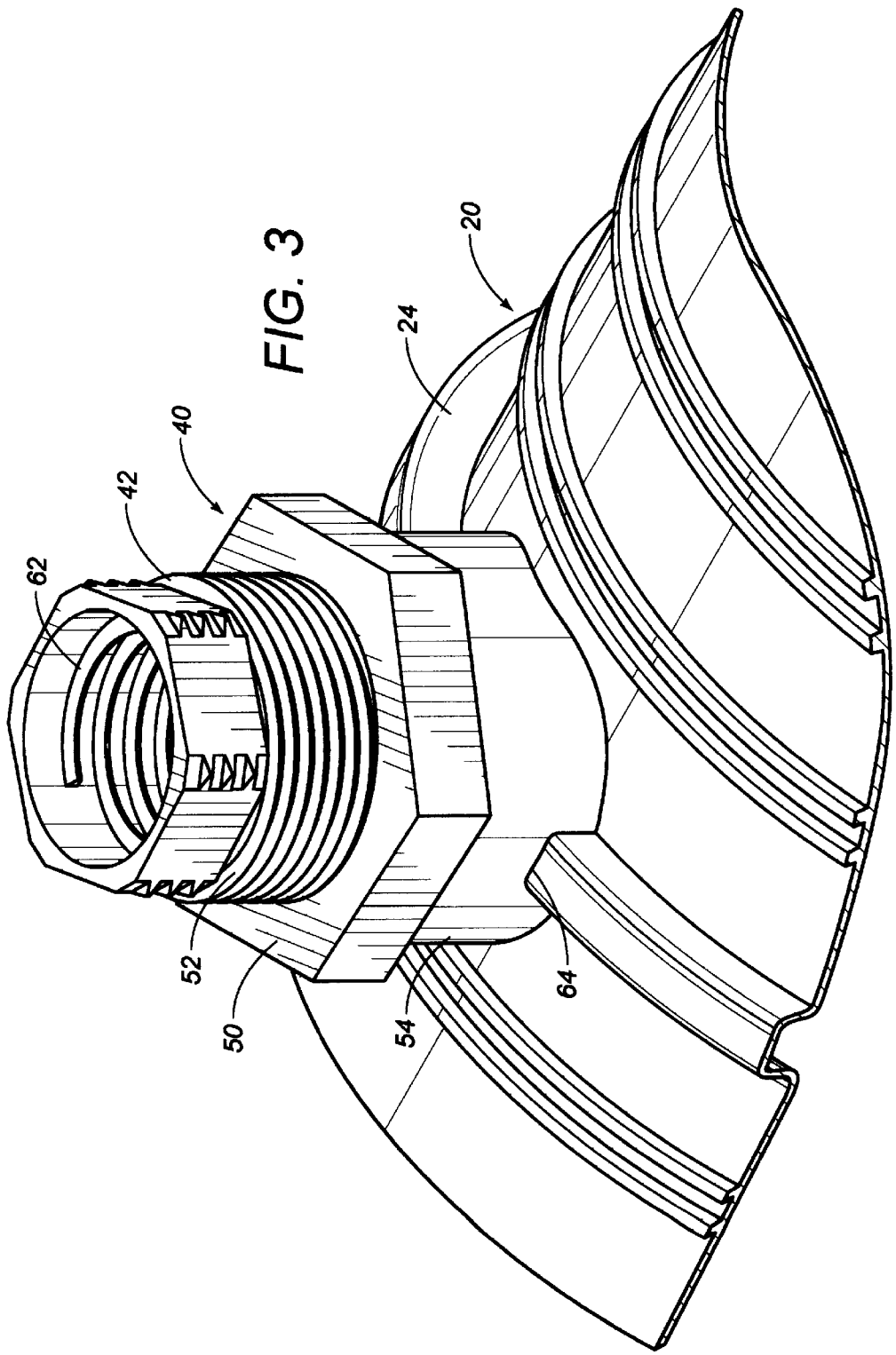
FIG. 3 is a perspective view showing the installation of the grout vent of the present invention on the tubular duct.

FIG. 3 shows the installation of the grout vent 40 upon the duct 20. In particular, in FIG. 3, the tubular fitting 42 is illustrated as having threaded exterior surface 52. Nut 50 is threadedly engaged around the exterior surface 52 of the tubular fitting 42. The tubular fitting 42 also has a threaded interior surface 62. The threaded interior surface 62 is suitable for the receipt of the end of the grout line 56 therein. The threading of the grout line 56 into the threaded interior surface 62 assures a proper connection of the grout line 36 with the tubular fitting 42. The threading avoids peripheral leakage.

In FIG. 3, it can be seen that the seal 54 has a slot 64 formed therein which conforms to the exterior shape of the corrugation 24 of the duct 20. As a result, when the nut 50 is suitably tightened, the seal 54 will exert a liquid-tight sealing relationship against the exterior surface of the corrugation 24 and also against the exterior surface of the duct 20. Leakage of grout through the hole 36 of the duct 20 is effectively prevented.

Figure 4:
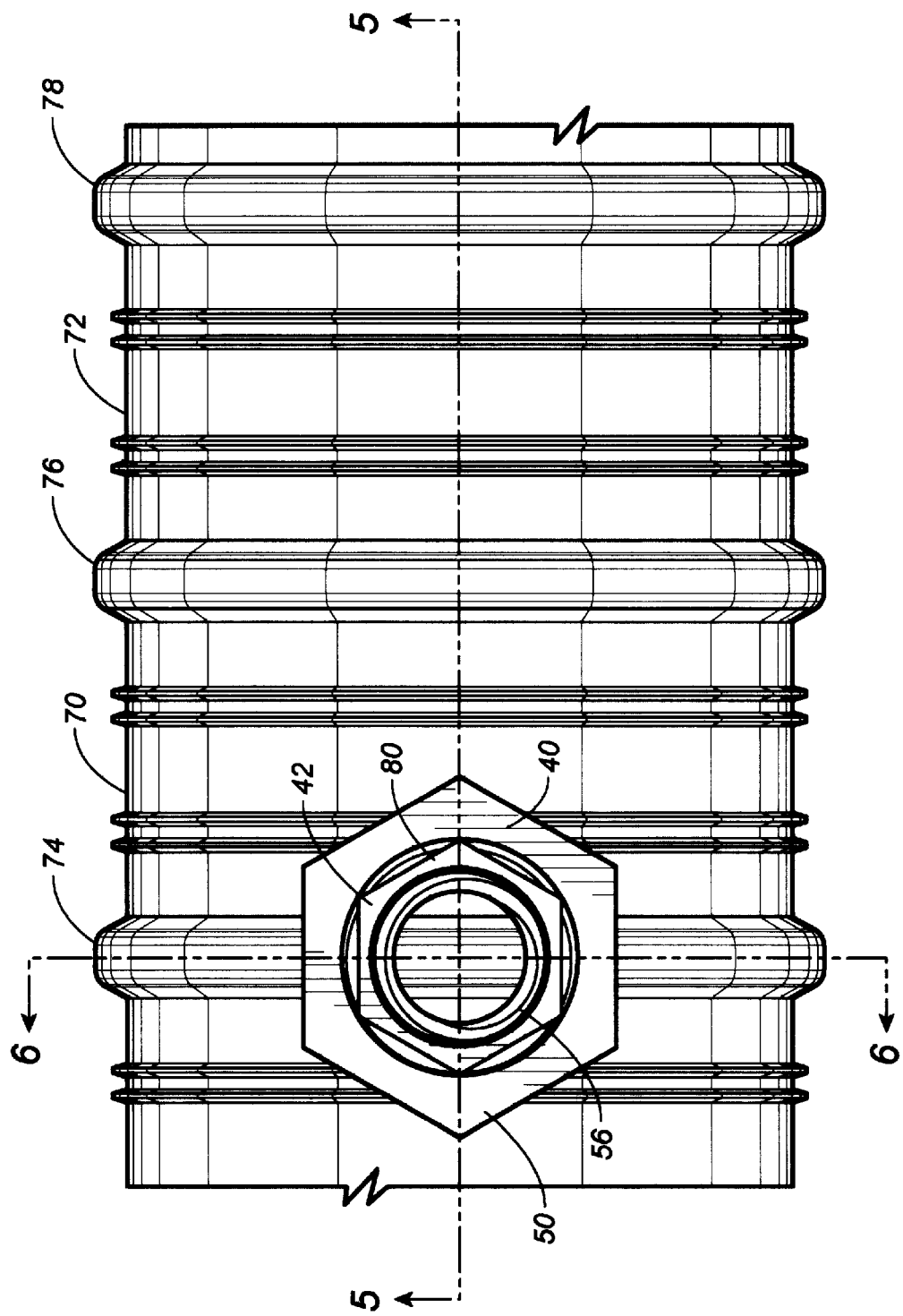
FIG. 4 is a plan view showing the grout vent of the present invention as placed on the tubular duct.

In FIG. 4, the present invention is particularly illustrated as used with a different type of duct 70. Duct 70 is similar to the duct 20, as shown in FIG. 1, but lacks the longitudinal channels. In FIG. 4, the duct 70 is a tubular body 72 having separated corrugations 74, 76 and 78. A suitable hole is formed on corrugations 74 so as to allow for the installation of the grout vent 40 of the present invention. The grout vent 40 of the present invention, as illustrated in FIG. 4 has an identical configuration to that shown in the previous figures of the previous invention. In particular, in FIG. 4, it can be seen that the 50 has a generally hexagonal configuration. This hexagonal configuration of the nut 50 allows the nut 50 to be tightened with a conventional wrench. The tubular fitting 42 also has a hexagonal shaped upper surface which similarly allows for tightening and securement with a wrench. For example, as the nut 50 is being tightened around the threaded exterior surface 52 of the tubular fitting 42, the tubular fitting can be secured with another wrench so as to avoid relative rotation of the components. Grout line 56 is shown as extending through the interior of the tubular fitting 42.

Figure 5:
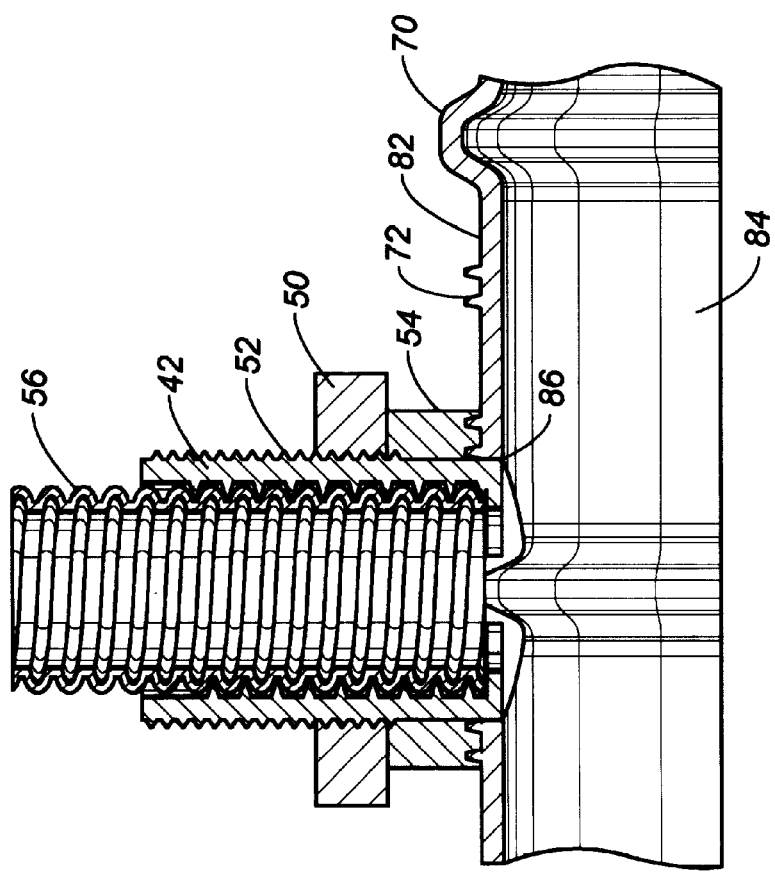
FIG. 5 is a cross-sectional view as taken across lines 5—5 of FIG. 4.

In FIG. 5, the tubular fitting 42 is shown as having its threaded exterior surface 52. The nut 50 is suitably tightened around this threaded exterior surface 52 so as to exert a compressive force against the seal 54. Seal 54 will establish a liquid-tight connection with the exterior surface 82 of the tubular body 72 of duct 70. The grout line 56 is threadedly installed within the threaded interior of the tubular fitting 42. The grout line 56 has an end which communicates with the interior passageway 84 of the duct 70. As a result, grout can be suitably injected into the interior passageway 84 through hole 86 formed in the corrugation 74 of duct 70.

Figure 6:
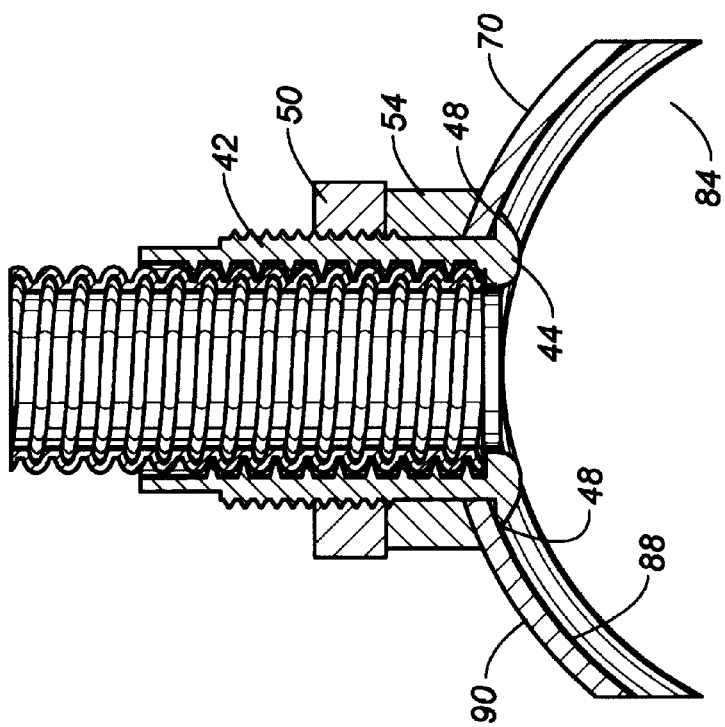
FIG. 6 is a cross-sectional view as taken across lines 6—6 of FIG. 4.

FIG. 6 shows the cross-sectional view taken across lines 6—6 of FIG. 4. As can be seen in FIG. 6, the tubular fitting 42 has connector section 44 at a lower end thereof. Section 44 has shoulders 48 formed thereon. Shoulders 48 have a surface in surface-to-surface contact with the interior surface 88 of wall 90 of duct 70. As a result, a suitable liquid-tight fitting is established within the interior passageway 84 of duct 70. The nut 50 is shown as exerting a compressive force against the washer 54.

The present invention achieves various advantages over the prior art. Most importantly, the present invention allows grout to be injected into the interior passageway of the respective ducts in an easy manner. The grout line 56 can be simply threadedly installed within the threaded interior of the tubular fitting 42. The grout line 56 and the tubular fitting 42 can then be pushed into the hole formed on the duct 20. The connector 44, including shoulders 48, can be suitably compressed so as to be forced through the hole 36 without damage. Once pushed through the hole 36, the shoulders 48 will return to their original position so as to establish a secure engagement with the wall 34 of the tubular body 22 of the duct 20.

At any time during the process, the washer 54 and the nut 50 can be placed in a location adjacent to the tubular fitting 42. After installation of the end of the tubular fitting 42 into the hole 36 of the duct 20, the washer 54 can be pushed along the exterior surface of the tubular fitting 42 so as to reside against the exterior surface of the duct 20. Next, the nut 50 can be placed so as to be suitably rotated around the threaded exterior of the tubular fitting 42. Eventually, with suitable rotation, the nut 50 will compressively urge the seal 54 into a liquid-tight engagement with the exterior surface of the duct 20. Similarly, it will draw the connector 44, along with its associated shoulders 48, upwardly so as to also establish a.more secure, liquid-tight fit, with the wall 34 of the duct 20. As a result, the wall 34 will be sandwiched between the shoulders 48 and the bottom surface of the seal 54.

By placing the connector 44 in the area of the corrugations, or in the area of the longitudinal channels, interference with the passage of the tendons through the interior passageway 26 of the duct 20 is avoided. Since the tendons will not enter the area of the corrugations, the placement of the end 44 of the grout vent will not create any obstructions.

The present invention can easily installed by unskilled workers at the job site. Under certain circumstances, the hole in the duct can be formed of the job site by drilling a hole through the wall of the duct. The components can be easily assembled into such a hole. Furthermore, the components of the present invention are relatively easy to manufacture.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A tendon-receiving duct comprising:

a tubular body having an interior passageway, said tubular body having a hole formed through a wall thereof, said tubular body having a plurality of corrugations extending radially outwardly therefrom, each of said plurality of corrugations being in spaced relationship to an adjacent corrugation, each of said plurality of corrugations opening to said interior passageway, said tubular body having a longitudinal channel extending between adjacent corrugations of said plurality of corrugations;

a tubular fitting affixed through said hole so as to communicate with said interior passageway of said tubular body; and a seal extending around an exterior surface of said tubular fitting, said seal being in liquid-tight engagement against an exterior surface of said tubular body.

2. The duct of claim 1, further comprising:

a nut secured around an exterior surface of said tubular fitting, said seal being interposed between said nut and said exterior surface of said tubular body.

3. The duct of claim 2, said nut being threadedly engaged with said exterior surface of said tubular fitting, said nut compressing said seal against said exterior surface of said tubular body.

4. The duct of claim 1, further comprising:

a grout line extending through an interior passageway of said tubular fitting, said grout line communicating with said interior passageway of said tubular body.

5. The duct of claim 4, said interior passageway of said tubular fitting being threaded, said grout line being threadedly engaged with said interior passageway of said tubular fitting.

6. The duct of claim 1, said tubular fitting having a connector at an end thereof, said connector abutting an interior surface of said wall of said tubular body.

7. The duct of claim 6, said connector comprising an outwardly extending shoulder formed at said end of said tubular fitting, said shoulder having a surface in surface-to-surface contact with said interior surface of said wall of said tubular body.

8. The duct of claim 1, said hole being formed on at least one of said plurality of corrugations.

9. The duct of claim 1, said hole being formed on said longitudinal channel.

10. The duct of claim 8, said seal having a slot formed on an end thereof, said slot having a shape conforming to an exterior surface of the corrugation.

11. The duct of claim 1, said seal being an annular elastomeric washer compressively engaged against said exterior surface of said tubular body.

* * * * *